US012596649B2

(12) United States Patent
Baek

(10) Patent No.: US 12,596,649 B2
(45) Date of Patent: Apr. 7, 2026

(54) MEMORY ACCESS DEVICE AND OPERATING METHOD THEREOF

(71) Applicant: REBELLIONS INC., Seongnam-si (KR)

(72) Inventor: Seungcheol Baek, Seoul (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 19/260,222

(22) Filed: Jul. 3, 2025

(65) Prior Publication Data

US 2025/0335364 A1 Oct. 30, 2025

Related U.S. Application Data

(63) Continuation of application No. PCT/KR2023/005463, filed on Apr. 21, 2023.

(30) Foreign Application Priority Data

Jan. 6, 2023 (KR) ........................ 10-2023-0002439

(51) Int. Cl.
*G06F 12/08* (2016.01)
*G06F 12/084* (2016.01)
(Continued)

(52) U.S. Cl.
CPC ........ *G06F 12/0895* (2013.01); *G06F 12/084* (2013.01); *G06F 13/1673* (2013.01)

(58) Field of Classification Search
CPC .... G06F 12/08; G06F 12/0895; G06F 12/084; G06F 13/1673; G06F 12/0695; G06F 12/12; G06F 12/02; G06F 13/16
See application file for complete search history.

(56) References Cited

U.S. PATENT DOCUMENTS 6,111,793 A * 8/2000 Ayukawa ................. G11C 8/16
365/230.09
6,766,424 B1 * 7/2004 Wilson ................ G06F 12/0813
711/148
(Continued)

FOREIGN PATENT DOCUMENTS

EP 0604015 A2 * 6/1994 ......... G06F 12/0888
JP 2016-91475 A 5/2016
(Continued)

OTHER PUBLICATIONS

V. Seshadri et al., "Gather-Scatter DRAM: In-DRAM address translation to improve the spatial locality of non-unit strided accesses," 2015 48th Annual IEEE/ACM International Symposium on Microarchitecture (MICRO), Waikiki, HI, USA, 2015, pp. 267-280.*
(Continued)

*Primary Examiner* — Pierre Michel Bataille
(74) *Attorney, Agent, or Firm* — BROADVIEW IP LAW, PC

(57) ABSTRACT

Provided is an operating method of a memory access device, the operating method including allowing an access of a first processing element to a plurality of data lines of a memory based on a first command, identifying a number of accesses of the first processing element to the plurality of data lines, and when a number of accesses of the first processing element to a first data line among the plurality of data lines reaches a predetermined number of accesses, allowing an access of a second processing element to the first data line based on a second command.

13 Claims, 10 Drawing Sheets

(51) Int. Cl.
   *G06F 12/0895* (2016.01)
   *G06F 13/16* (2006.01)

(56) References Cited

U.S. PATENT DOCUMENTS

| | | | | |
|---|---|---|---|---|
| 8,510,514 | B2 | 8/2013 | Kwon et al. | |
| 9,152,547 | B2 | 10/2015 | Lee et al. | |
| 9,176,906 | B2 | 11/2015 | Kwon et al. | |
| 9,720,600 | B2 * | 8/2017 | Kawaba | G06F 3/0611 |
| 9,761,300 | B1 * | 9/2017 | Willcock | G11C 19/00 |
| 9,875,191 | B2 | 1/2018 | Chang et al. | |
| 10,387,037 | B2 * | 8/2019 | Venkatesh | G06F 3/0638 |
| 11,061,820 | B2 | 7/2021 | Speier | |
| 11,196,746 | B2 * | 12/2021 | Karin | H04L 63/101 |
| 11,347,551 | B2 | 5/2022 | Walter et al. | |
| 11,429,524 | B2 * | 8/2022 | Kumar | G06F 12/0646 |
| 11,561,711 | B2 | 1/2023 | Kwon et al. | |
| 11,914,517 | B2 * | 2/2024 | Blagodurov | G06F 12/0815 |
| 2009/0006876 | A1 * | 1/2009 | Fukatani | G06F 3/0625 |
| | | | | 713/320 |
| 2014/0181449 | A1 * | 6/2014 | Kwon | G06F 12/06 |
| | | | | 711/163 |
| 2018/0074751 | A1 * | 3/2018 | Ngu | G06F 3/0659 |
| 2021/0064452 | A1 * | 3/2021 | Nigam | H04L 69/40 |
| 2022/0050722 | A1 * | 2/2022 | Dugast | G06F 9/5016 |
| 2022/0100668 | A1 * | 3/2022 | Blagodurov | G06F 12/0815 |

FOREIGN PATENT DOCUMENTS

| | | | |
|---|---|---|---|
| KR | 10-0895298 | B1 | 5/2009 |
| KR | 10-2014-0081162 | A | 7/2014 |
| KR | 10-1615659 | B1 | 5/2016 |
| KR | 10-1887288 | B1 | 8/2018 |
| KR | 10-2022-0032366 | A | 3/2022 |
| KR | 10-2022-0054389 | A | 5/2022 |

OTHER PUBLICATIONS

International Search Report & Written Opinion for PCT/KR2023/005463 by Korean Intellectual Property Office dated Sep. 25, 2023.

* cited by examiner

MEMORY ACCESS DEVICE AND OPERATING METHOD THEREOF

CROSS-REFERENCE TO RELATED APPLICATIONS

This application is a continuation application of International Application No. PCT/KR2023/005463, filed on Apr. 21, 2023, in the Korean Intellectual Property Office and claiming priority to Korean Patent Application No. 10-2023-0002439, filed on Jan. 6, 2023, in the Korean Intellectual Property Office, the disclosures of each of these applications are incorporated by reference herein in their entireties.

TECHNICAL FIELD

The present disclosure relates to a memory access device and an operating method thereof.

BACKGROUND ART

A scratchpad memory or cache memory is used to reduce or hide a latency of accessing off-chip data in central processing unit (CPU) or graphics processing unit (GPU) architectures. In terms of the scratchpad memory, since a memory capacity is limited, methods to efficiently manage data required by a processing element are being studied.

In addition, recent artificial intelligence technology has shown remarkable performance improvements in various fields such as image recognition, voice recognition, and natural language processing, and accordingly, independent hardware for artificial intelligence is being developed. For example, devices are being developed to efficiently accelerate compute-intensive convolutional neural network (CNN) operations as well as very large natural language processing models of a memory-intensive transformer series requiring an access to large memory data.

DETAILED DESCRIPTION OF THE INVENTION

Technical Goals

According to example embodiments of the present disclosure, there is provided a memory access device and an operating method thereof. The technical goals to be achieved by the present example embodiments are not limited to the technical goals described above, and other technical goals can be inferred from the following example embodiments.

Technical Solutions

According to a first example embodiment, an operating method of a memory access device includes allowing an access of a first processing element to a plurality of data lines of a memory based on a first command, identifying a number of accesses of the first processing element to the plurality of data lines, and when a number of accesses of the first processing element to a first data line among the plurality of data lines reaches a predetermined number of accesses, allowing an access of a second processing element to the first data line based on a second command.

According to a second example embodiment, a memory access device includes a buffer in which a first command and a second command are stored, and a controller that allows an access of a first processing element to a plurality of data lines of a memory based on the first command, identifies a number of accesses of the first processing element to the plurality of data lines, and when a number of accesses of the first processing element to a first data line among the plurality of data lines reaches a predetermined number of accesses, allows an access of a second processing element to the first data line based on the second command.

When a number of accesses of the first processing element to a second data line among the plurality of data lines reaches the predetermined number of accesses, the controller may allow an access of the second processing element to the second data line based on the second command.

The memory may include the plurality of data lines, and a first tag area and a second tag area corresponding to each of the plurality of data lines. In the first tag area, information indicating whether to allow an access of a processing element for each data line may be stored. In the second tag area, information indicating a number of accesses of a processing element for each data line may be stored.

The controller may allow the access of the first processing element to the plurality of data lines by changing information of the first tag area, and identify the number of accesses of the first processing elements to each of the plurality of data lines by monitoring the second tag area.

The controller may store (1-1)-th data of first data of an external memory in a predetermined number of data lines among the plurality of data lines of the memory, allow an access of a processing element to the predetermined number of data lines, identify a number of accesses of the processing element to the predetermined number of data lines, when a number of accesses of the processing element to each of the predetermined number of data lines reaches a predetermined number of accesses, store (1-2)-th data of the first data in the predetermined number of data lines, and allow the access of the processing element to the predetermined number of data lines.

The controller may store (1-1)-th data of first data stored in the plurality of data lines of the memory, in a predetermined number of data lines among a plurality of data lines of an external memory and when a number of accesses of a processing element to each of the predetermined number of data lines reaches a predetermined number of accesses, store (1-2)-th data of the first data in the predetermined number of data lines.

The controller may store first data of an external memory in the plurality of data lines based on the first command and allow an access of the first processing element to the plurality of data lines in which the first data is stored. When the number of accesses of the first processing element to the first data line among the plurality of data lines reaches the predetermined number of accesses, the controller may store a portion of data among second data of the external memory in the first data line based on the second command and allow an access of the second processing element to the first data line in which the portion of data is stored.

When a number of accesses of the first processing element to a second data line among the plurality of data lines reaches the predetermined number of accesses, the controller may store another portion of data among the second data of the external memory in the second data line based on the second command and allow an access of the second processing element to the second data line in which the other portion of data is stored.

The controller may store (1-1)-th data of first data of the external memory in a predetermined number of data lines among the plurality of data lines of the memory, allow an access of the first processing element to the predetermined number of data lines, identify a number of accesses of the first processing element to the predetermined number of data lines, when the number of accesses of the first processing element to each of the predetermined number of data lines reaches the predetermined number of accesses, store (1-2)-th data of the first data in the predetermined number of data lines, and allow the access of the first processing element to the predetermined number of data lines.

The controller may allow an access of a processing element to the plurality of data lines of the memory based on a third command, identify a number of accesses of the processing element to the plurality of data lines, and when a number of accesses of the processing element to the first data line of the plurality of data lines reaches the predetermined number of accesses, store data stored in the first data line in an external memory.

When a number of accesses of the processing element to the second data line among the plurality of data lines reaches the predetermined number of accesses, the controller may store data stored in the second data line in the external memory.

According to a third example embodiment, an accelerator includes a memory, a first processing element, a second processing element, and a memory access device that allows an access of the first processing element to a plurality of data lines of the memory based on a first command, identifies a number of accesses of the first processing element to the plurality of data lines, and when a number of accesses of the first processing element to a first data line among the plurality of data lines reaches a predetermined number of accesses, allows an access of the second processing element to the first data line based on a second command.

According to a fourth example embodiment, a computer-readable recording medium includes a non-volatile recording medium in which a program for executing the above-described method in a computer is recorded.

Details of other example embodiments are included in the detailed description and drawings.

Effects of the Invention

According to the present disclosure, effects such as fast data transfer or latency hiding may be achieved since an access of a second processing element to data lines may be made even when an access of a first processing element to a plurality of data lines is not completed.

In addition, according to the present disclosure, when data loading is required for all the plurality of data lines, the data loading may be performed using only a portion of the plurality of data lines and thus, a smaller memory space may be consumed.

Effects of the present disclosure are not limited to those described above and other effects may be made apparent to those skilled in the art from the following description.

MODE FOR CARRYING OUT THE INVENTION

Terms used in the example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

In the following description, example embodiments of the present disclosure will be described in detail with reference to the drawings so that those skilled in the art can easily carry out the present disclosure. The present disclosure may be embodied in many different forms and is not limited to the embodiments described herein.

Hereinafter, example embodiments of the present disclosure will be described with reference to the drawings.

In the present disclosure, accessing a memory may indicate reading data from the memory or writing (or storing) data. In addition, an internal memory may indicate an on-chip memory, and an external memory may indicate an on-chip memory excluding the internal memory or an off-chip memory.

Figure 1:
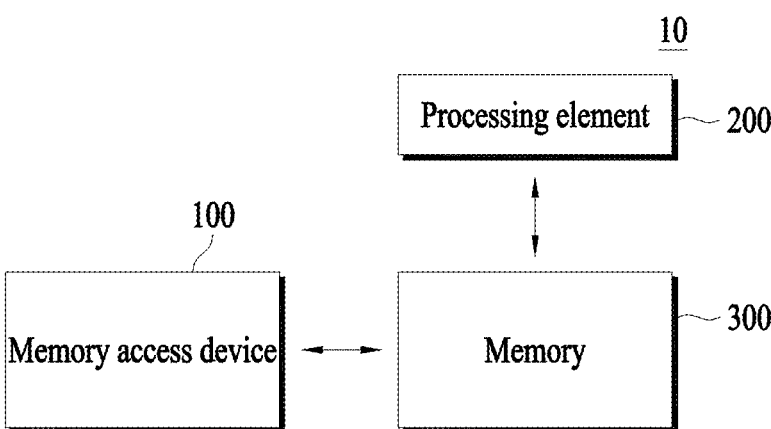
FIG. 1 illustrates an accelerator according to an example embodiment.

FIG. 1 illustrates an accelerator according to an example embodiment.

An accelerator 10 may include a memory access device 100, a processing element 200, and a memory 300. According to an example embodiment, the accelerator 10 may be dedicated hardware for neural networks to quickly process operations frequently used in neural networks. For example, the accelerator 10 may quickly process operations such as convolution, activation, pooling, and normalization in neural networks. According to an example embodiment, the accelerator 10 may be a hardware accelerator such as a neural processing unit (NPU), a tensor processing unit (TPU), a neural engine, and the like, which are dedicated modules for operating neural networks, but are not limited thereto. FIG. 1 illustrates only components of the accelerator 10 related to the present example embodiment. However, it is obvious to those skilled in the art that other general-purpose components may be further included in addition to the components illustrated in FIG. 1.

The memory 300 is a memory directly accessible to the processing element 200 and may include an on-chip memory. According to an example embodiment, the memory 300 may include a scratchpad memory. According to another example embodiment, the memory 300 may include a cache memory. For example, the memory 300 may include a static random access memory (SRAM). The memory 300 may include a plurality of data lines (or a plurality of entries), and each of the plurality of data lines may store data.

The processing element 200 may access the memory 300 to perform an operation. The processing element 200 may read data from the memory 300, write data to the memory 300, and perform an operation based on data in the memory 300. The processing element 200 may include, for example, a neural vector processor (NVP), a multiply and accumulation (MAC) array, an arithmetic and logical unit (ALU), and a computational unit for a matrix multiplication convolution (MXC). The processing element 200 may be provided as a plurality of processing elements. For example, the processing element 200 may include a first processing element for a first operation and a second processing element for a second operation.

The processing element 200 may operate based on an input command. For example, the processing element 200 may perform a first convolution operation by reading first data stored in at least one data line of the memory 300 based on a first command, and may perform a second convolution operation by reading second data stored in at least one data line of the memory 300 based on a second command. In addition, the processing element 200 may access the plurality of data lines of the memory 300 based on a sequential access pattern (or linear access pattern). Specifically, the processing element 200 may sequentially access the plurality of data lines of the memory 300 in units of one data line or in units of a predetermined number of data lines. According to an example, when the plurality of data lines includes a first data line to a 512-th data line, the processing element 200 may sequentially access each data line from the first data line to the 512-th data line. According to another example, the processing element 200 may access the plurality of data lines in units of 16 data lines and thus, may access data lines from a first data line to a 16-th data line and then access 17-th through 32-nd data lines.

The memory access device 100 may allow or disallow the processing element 200 to access at least one data line of the memory 300. In other words, the memory access device 100 may control the processing element 200 to or not to access at least one data line of the memory 300. According to an example embodiment, the memory access device 100 may change information or values of a tag area corresponding to at least one data line to allow or disallow the processing element 200 to read data stored in at least one data line, or the processing element 200 to write data to at least one data line. In addition, the memory access device 100L the processing element 200 may load data from an external memory required for an operation process of the processing element 200 into at least one data line of the memory 300. According to an example embodiment, the memory access device 100 may include a direct memory access (DMA) engine.

The memory access device 100 may operate based on an input command. The command may include at least one of a command requesting (or instructing) monitoring of the processing element 200 accessing a data line of the memory 300, a command requesting loading of data required for the processing element 200 to perform an operation, and a command requesting storing of operation result data of the processing element 200 stored in a data line of the memory 300. The command may include information required for the operation of the memory access device 100. The command may include a code configured with a plurality of fields, each including information required for the operation of the memory access device 100. Table 1 represents an example of information included in the command.

TABLE 1

| Field | Bit-length | Description |
|---|---|---|
| cmd_type | 1 | 0 = normal DMA, 1 = AMA |
| cmd_id | 9 | Determined by a number of cores and a number of first tables. For example, if there are 8 first tables in each of 64 cores, 8*64 –> 9 bits. |
| request_type | 2 | 4 types. 0 = monitoring for read only, 1 = monitoring for write only, 2 = loading and monitoring (for reading), 3 = monitoring and storing (for reading/writing). |
| reuse_cnt | 5 | 5 bits for memory access monitoring |
| make_invalid | 1 | When this flag is set, data line is rendered invalid after reuse. |
| num_fold_spm | 5 | 0 = use only one base address, 1 = normal, 2 ~= generate address according to the following formula (Addr = addr_base + addr_offset % num_fold_spm) |
| num_fold_mem | 5 | 0 = use only one base address, 1 = normal, 2 ~= generate address according to the following formula (Addr = addr_base + addr_offset % num_fold_mem) |
| mem_addr_base | 40 | Base address of external memory for requesting data loading and storing |
| mem_addr_offset | 17 | Offset address of external memory for requesting data loading and storing |
| spm_addr_base | 40 | Base address of internal memory for requesting data loading and storing |
| spm_addr_offset | 17 | Offset address of internal memory for requesting data loading and storing |

In Table 1, 'cmd_type' denotes information on a type of a command, 'cmd_id' denotes ID information on the command, 'request_type' denotes information on content requested by the command, 'reuse_cnt' denotes information on a predetermined number of accesses to a data line, 'make_invalid' denotes information indicating that an access to a data line is unavailable when a number of accesses to the data line reaches the predetermined number of accesses, 'num_fold_spm' denotes information on a number of data lines to be redundantly used in the memory 300, 'num_fold_mem' information on a number of data lines to be redundantly used in an external memory, 'mem_addr_base' and 'mem_addr_offset' denote base address information of the external memory and offset address information of the external memory for data loading or data storing, and 'spm_addr_base' and 'spm_addr_offset' denote base address information of the memory 300 and offset address information of the memory 300 for data loading or data storing. According to an example embodiment, when 'num_fold_spm' is zero, the number of data lines to be redundantly used in the memory 300 may be one. When 'num_fold_spm' is one, no data line may be redundantly used in the memory 300. Similarly, when 'num_fold_mem' is zero, the number of data lines to be redundantly used in the external memory may be one. When 'num_fold_mem' is one, no data line may be redundantly used in the external memory.

The command may be classified into a type such as an asynchronous memory access (AMA) command or a direct memory access (DMA) command. The AMA command may be classified as, for example, a command requesting monitoring for reading or writing of a processing element, a command requesting data loading and monitoring for reading of the processing element, and a command requesting monitoring and data storage for reading or writing of the processing element. The DMA command may indicate a command requesting data loading or data storing. The command may contain code generated by a compiler and may be generated based on an application or workload.

For example, the memory access device 100 may load first data into at least one data line of the memory 300 based on the first command so that the processing element 200 may read the first data, and may load second data into at least one data line of the memory 300 based on the second command so that the processing element 200 may read the second data.

The memory access device 100 may identify a number of accesses of the processing element 200 to at least one data line of the memory 300. According to an example embodiment, information on the number of accesses of the processing element 200 to at least one data line may be stored in a tag area corresponding to the at least one data line, and the memory access device 100 may identify the number of accesses of the processing element 200 by monitoring the tag area.

The memory access device 100 may allow the first processing element to access the plurality of data lines of the memory 300 based on the first command. Subsequently, the memory access device 100 may identify a number of accesses of the first processing element to the plurality of data lines. When a number of accesses of the first processing element to a first data line among the plurality of data lines reaches the predetermined number of accesses, the memory access device 100 may allow an access of the second processing element to the first data line based on the second command. In other words, the memory access device 100 may allow the second processing element to access the first data line even while the first processing element is accessing a data line other than the first data line. In addition, when a number of accesses of the first processing element to a second data line among the plurality of data lines reaches the predetermined number of accesses, the memory access device 100 may allow an access of the second processing element to the second data line based on the second command.

Accordingly, the memory access device 100 may provide effects such as fast data transfer or latency hiding, since an access of the second processing element to the data lines may be made even when an access of the first processing element to all the plurality of data lines is not completed. Therefore, according to the present disclosure, since the memory access device 100 or the processing element may operate on a data line basis instead of a command basis (i.e., having a data line basis dependency instead of a command basis dependency), data transfer may be further accelerated.

Figure 2:
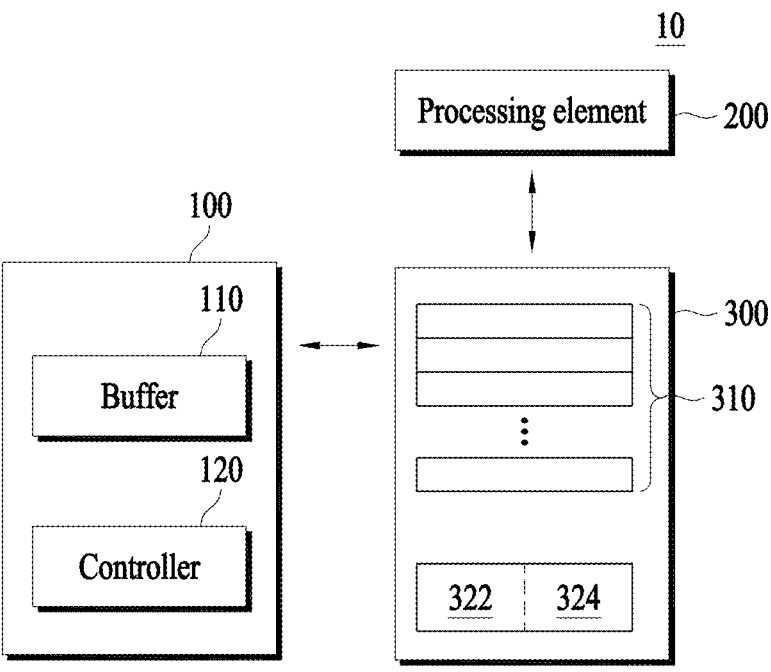
FIG. 2 illustrates an accelerator according to another example embodiment.

FIG. 2 illustrates an accelerator according to another example embodiment.

The memory access device 100 may include a buffer 110 and a controller 120.

The buffer 110 may store at least one command that is input. According to an example embodiment, the buffer 110 may include a queue having a first-in, first-out (FIFO) structure.

The controller 120 may control an overall operation of the memory access device 100. The controller 120 may allow an access of a first processing element to a plurality of data lines of the memory 300 based on a first command. Subsequently, the controller 120 may identify a number of accesses of the first processing element to the plurality of data lines. When a number of accesses of the first processing element to a first data line among the plurality of data lines reaches the predetermined number of accesses, the controller 120 may allow an access of a second processing element to the first data line based on a second command. In addition, when a number of accesses of the first processing element to a second data line among the plurality of data lines reaches the predetermined number of accesses, the controller 120 may allow an access of the second processing element to the second data line based on the second command.

The memory 300 may include a plurality of data lines 310, and a first tag area 322 and a second tag area 324 corresponding to each of the plurality of data lines 310. For example, the memory 300 may include a first tag area and a second tag area corresponding to the first data line, and a first tag area and a second tag area corresponding to the second data line.

The first tag area 322 may store information indicating whether an access to a processing element is to be allowed for each data line. Specifically, the first tag area 322 may store one-bit information and have a value of 0 (invalid) or 1 (valid). For example, when the first tag area has the value "0", an access of a processing element to a corresponding data line may be disallowed. Also, when the first tag area has the value "1", an access of a processing element to a corresponding data line may be allowed.

The controller 120 may change information on the first tag area 322 to allow or disallow an access of a processing element to a corresponding data line. For example, the controller 120 may change the value of the first tag area corresponding to the first data line from "0" to "1" to allow an access of a processing element to the first data line. In other words, the value of the first tag area may be changed from "0" to "1" by the controller 120 so that the processing element may access the first data line. In addition, the controller 120 may change the value of the first tag area corresponding to the first data line from "1" to "0" to disallow the access of the processing element to the first data line. In other words, the value of the first tag area may be changed from "1" to "0" by the controller 120 so that the processing element may not access the first data line.

The second tag area 324 may include information indicating a number of accesses of a processing element for each data line. Specifically, the second tag area 324 may include a counter to count the number of accesses of a processing element for each data line. For example, the second tag area 324 may include a 5-bit binary counter corresponding to each of the plurality of data lines.

The controller 120 may identify the number of accesses of the processing element to each of the plurality of data lines by monitoring the second tag area 324.

FIG. 2 illustrates the memory 300 including the first tag area 322 and the second tag area 324, and this is merely an example. The first tag area 322 and the second tag area 324 may not be included in the memory 300. For example, the first tag area 322 and the second tag area 324 may be included in the memory access device 100.

Figure 3:
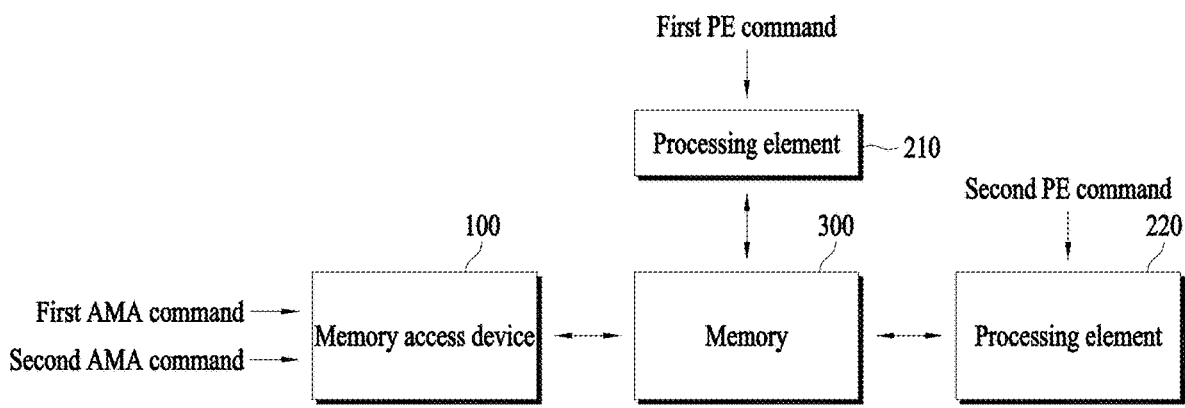
FIG. 3 illustrates an operation of a memory access device according to a first example embodiment.

FIG. 3 illustrates an operation of a memory access device according to a first example embodiment.

The memory access device 100 may sequentially receive a first AMA command and a second AMA command, and may sequentially operate based on the first AMA command and the second AMA command. The first AMA command may be a command requesting monitoring a first processing element 210 accessing a plurality of data lines of the memory 300 based on a first processing element (PE) command, and the second AMA command may be a command requesting a second processing element 220 accessing the plurality of data lines of the memory 300 based on a second PE command. For example, the first PE command may represent a command regarding a pooling operation of a neural network, and the second PE command may represent a command regarding a convolution operation performed subsequently to the pooling operation based on the first PE command. According to an example embodiment, the first processing element 210 and the second processing element 220 may be included in the processing element 200 of FIGS. 1 and 2.

The memory access device 100 may allow an access of the first processing element 210 to a plurality of data lines of the memory 300 based on the first AMA command. As a result, the first processing element 210 may access the plurality of data lines of the memory 300 and write result data of an operation performed based on the first PE command to the plurality of data lines.

The memory access device 100 may identify a number of accesses of the first processing element 210 to the plurality of data lines. Specifically, the memory access device 100 may identify a number of times that the first processing element 210 writes operation result data to each of the plurality of data lines. For example, the memory access device 100 may identify the number of accesses of the first processing element 210 to each of the plurality of data lines by monitoring the first tag area 322 of the memory 300.

When a number of accesses of the first processing element 210 to a first data line among the plurality of data lines reaches a predetermined number of accesses, the memory access device 100 may allow an access of the second processing element 220 to the first data line based on a second command. For example, when the first processing element 210 writes the operation result data to the first data line a predetermined number of times (for example, four times), the memory access device 100 may allow the second processing element 220 to access the first data line based on the second command, so that the second processing element 220 may read data stored in the first data line (for example, data written to the first data line by the first processing element 210). Likewise, when a number of accesses of the first processing element 210 to a second data line among the plurality of data lines reaches the predetermined number of accesses, the memory access device 100 may allow an access of the second processing element 220 to the second data line based on the second command.

As such, according to the present disclosure, instead of performing an operation based on the second PE command by the second processing element 220 after an operation based on the first PE command is performed by the first processing element 210, the second processing element 220 may perform the operation based on the second PE command while the first processing element 210 performs the operation based on the first PE command, which may lead to an achievement of an effect such as fast data transfer or latency hiding. In other words, according to the present disclosure, since the first processing element 210 and the second processing element 220 may operate on a data line basis instead of a command basis (i.e., having a data line basis dependency instead of a command basis dependency), data transfer may be further accelerated.

Figure 4:
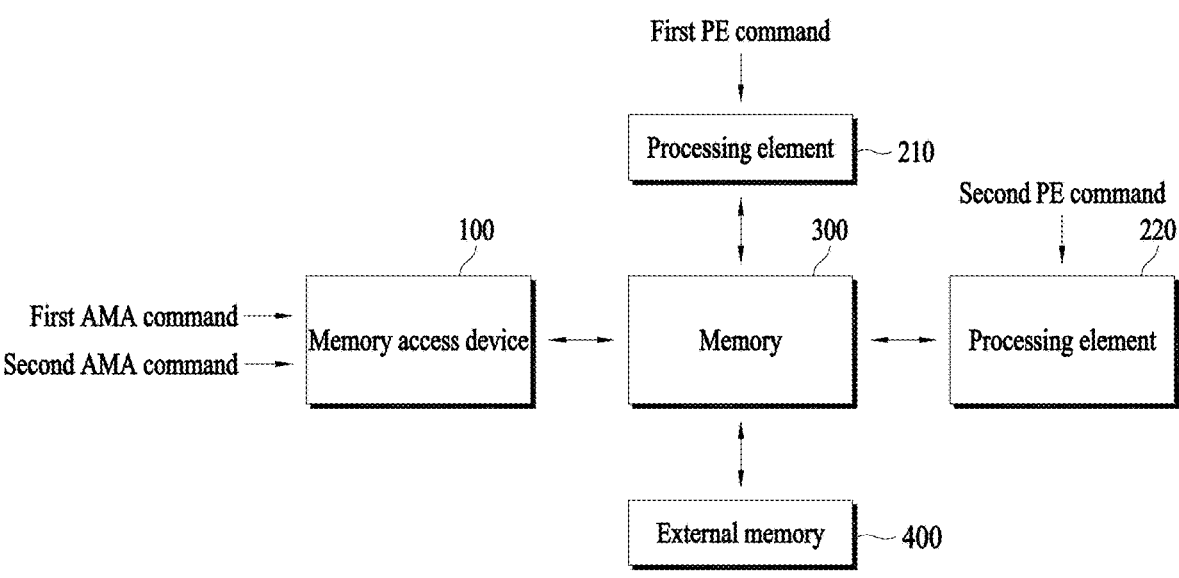
FIG. 4 illustrates an operation of a memory access device according to a second example embodiment.

FIG. 4 illustrates an operation of a memory access device according to a second example embodiment.

The memory access device 100 may sequentially receive a first AMA command and a second AMA command, and may sequentially operate based on the first AMA command and the second AMA command. The first AMA command may be a command requesting loading of data required by the first processing element 210 to perform an operation based on a first PE command and monitoring of the first processing element 210 accessing a plurality of data lines. The second AMA command may be a command requesting loading of data required by the second processing element 220 to perform an operation based on a second PE command and monitoring of the second processing element 220 accessing the plurality of data lines. The first AMA command and the second AMA command may be commands requesting data loading and monitoring for a same memory area of the memory 300. According to an example embodiment, the first processing element 210 and the second processing element 220 may be included in the processing element 200 of FIGS. 1 and 2. An external memory 400 may include an off-chip memory. In addition, the external memory 400 may be a memory included in an accelerator different from an accelerator including the memory 300.

The memory access device 100 may configure a table based on the first AMA command. For example, the table may include bits, a number of the bits corresponding to a number of the plurality of data lines of the memory 300, and each of the bits may be initialized to have a value "1." Here, a bit having a value of "1" may indicate that a number of accesses of a processing element to a corresponding data line does not reach a predetermined number of accesses, and a bit having a value of "0" may indicate that the number of accesses of the processing element to the corresponding data line reaches the predetermined number of accesses. Likewise, the memory access device 100 may configure a table based on the second AMA command. In addition, a dependency may be formed between the table corresponding to the first AMA command and the table corresponding to the second AMA command. For example, the table corresponding to the first AMA command may include information identifying a table corresponding to a command to be executed subsequently as the table corresponding to the second AMA command.

The memory access device 100 may store data of the external memory 400 in the plurality of data lines of the memory 300 based on the first AMA command. Specifically, the memory access device 100 may store data of the external memory 400 in the plurality of data lines to load data of the external memory 400 required by the first processing element 210 to perform an operation based on the first PE command. According to an example embodiment, the memory access device 100 may store the data of the external memory 400 in the plurality of data lines of the memory 300 using address information of the external memory 400 and address information of the memory 300 included in the first AMA command.

Subsequently, the memory access device 100 may allow an access of the first processing element 210 to the plurality of data lines. As a result, the first processing element 210 may access the plurality of data lines to read data and perform the operation based on the first PE command.

The memory access device 100 may identify a number of accesses of the first processing element 210 to the plurality of data lines. Specifically, the memory access device 100 may identify a number of times that the first processing element 210 reads data from each of the plurality of data lines. For example, the memory access device 100 may identify the number of accesses of the first processing element 210 to the plurality of data lines by monitoring the first tag area 322 of the memory 300.

When the number of accesses of the processing element 200 to the first data line among the plurality of data lines reaches a predetermined number of accesses, the memory access device 100 may store the data of the external memory 400 in the first data line among the plurality of data lines based on the second AMA command. Specifically, the memory access device 100 may store the data of the external memory 400 in the first data line to load the data of the external memory 400 required by the second processing element 220 to perform an operation based on the second PE command. For example, the memory access device 100 may identify information on the predetermined number of accesses stored in the table included in the first AMA command and when the number of accesses of the processing element 200 to the first data line reaches the predetermined number of accesses, may change a value of a bit corresponding to the first data line included in the table from "1" to "0." As a result, according to the dependency between the table corresponding to the first AMA command and the table corresponding to the second AMA command, the memory access device 100 may store the data of the external memory 400 in the first data line among the plurality of data lines based on the second AMA command.

Subsequently, the memory access device 100 may allow an access of the second processing element 220 to the first data line. As a result, the second processing element 220 may access the first data line to read the data and perform an operation based on the second PE command.

Likewise, when the number of accesses of the first processing element 210 to the second data line among the plurality of data lines reaches a predetermined number of accesses, the memory access device 100 may store the data of the external memory 400 in the second data line among the plurality of data lines based on the second command and allow an access of the second processing element 220 to the second data line. As a result, the second processing element 220 may access the second data line to read the data and perform an operation based on the second PE command.

As such, according to the present disclosure, after data loading is performed for the plurality of data lines based on the first AMA command, data loading based on the second AMA command may be performed for the data lines accessed by the first processing element 210. Therefore, since the second processing element 220 performs the operation based on the second PE command while the first processing element 210 performs the operation based on the first PE command, more effective latency hiding may be implemented.

According to an example embodiment, when the data of the external memory 400 is stored in the memory 300, the memory access device 100 may redundantly use a predetermined number of data lines of the memory 300 to store the data in the memory 300. A description of such will be provided in greater detail with reference to FIG. 6.

Figure 5:
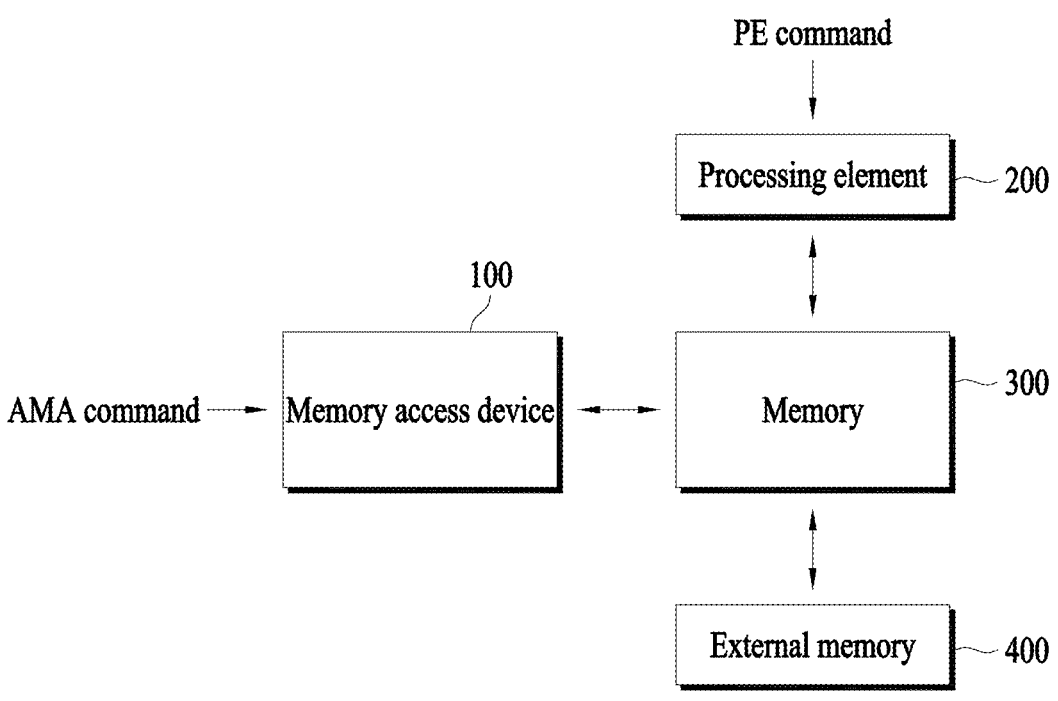
FIG. 5 illustrates an operation of a memory access device according to a third example embodiment.

FIG. 5 illustrates an operation of a memory access device according to a third example embodiment.

The memory access device 100 may operate based on an AMA command that is input. The AMA command may be a command requesting monitoring of the processing element 200 accessing a plurality of data lines of the memory 300 based on a PE command and storing of operation result data of the processing element 200 stored in the plurality of data lines.

The memory access device 100 may allow an access of the processing element 200 to the plurality of data lines of the memory 300 based on the AMA command. As a result, the processing element 200 may access the plurality of data lines of the memory 300 to write result data of an operation based on the PE command to the plurality of data lines or read data stored in the plurality of data lines for the operation based on the PE command.

The memory access device 100 may identify a number of accesses of the processing element 200 to the plurality of data lines. Specifically, the memory access device 100 may identify a number of times that the processing element 200 writes operation result data to the plurality of data lines or a number of times that the processing element 200 reads data stored in each of the plurality of data lines. For example, the memory access device 100 may identify the number of accesses of the processing element 200 to each of the plurality of data lines by monitoring the first tag area 322 of the memory 300.

When the number of accesses of the processing element 200 to the first data line among the plurality of data lines reaches a predetermined number of accesses, the memory access device 100 may store data stored in the first data line in the external memory 400. Subsequently, when the number of accesses of the processing element 200 to the second data line among the plurality of data lines reaches the predetermined number of accesses, the memory access device 100 may store data stored in the second data line in the external memory 400.

According to an example embodiment, the memory access device 100 may store the data stored in the plurality of data lines of the memory 300 in each of a plurality of external memories based on the AMA command. In other words, the memory access device 100 may transfer the data of the memory 300 to each of a first external memory and a second external memory, and the first external memory and the second external memory may store the transferred data.

As such, according to the present disclosure, instead of performing data storing after the processing element 200 completes the operation based on the PE command, separate data storing may be performed for each data line sequentially while the processing element 200 is performing the operation based on the PE command, which may allow data transfer with increased speed.

According to an example embodiment, when the data stored in the plurality of data lines of the memory 300 is stored in the external memory 400, the memory access device 100 may redundantly use a predetermined number of data lines of the external memory 400 to store the data in the external memory 400. A description of such will be provided in greater detail with reference to FIG. 7.

Figure 6:
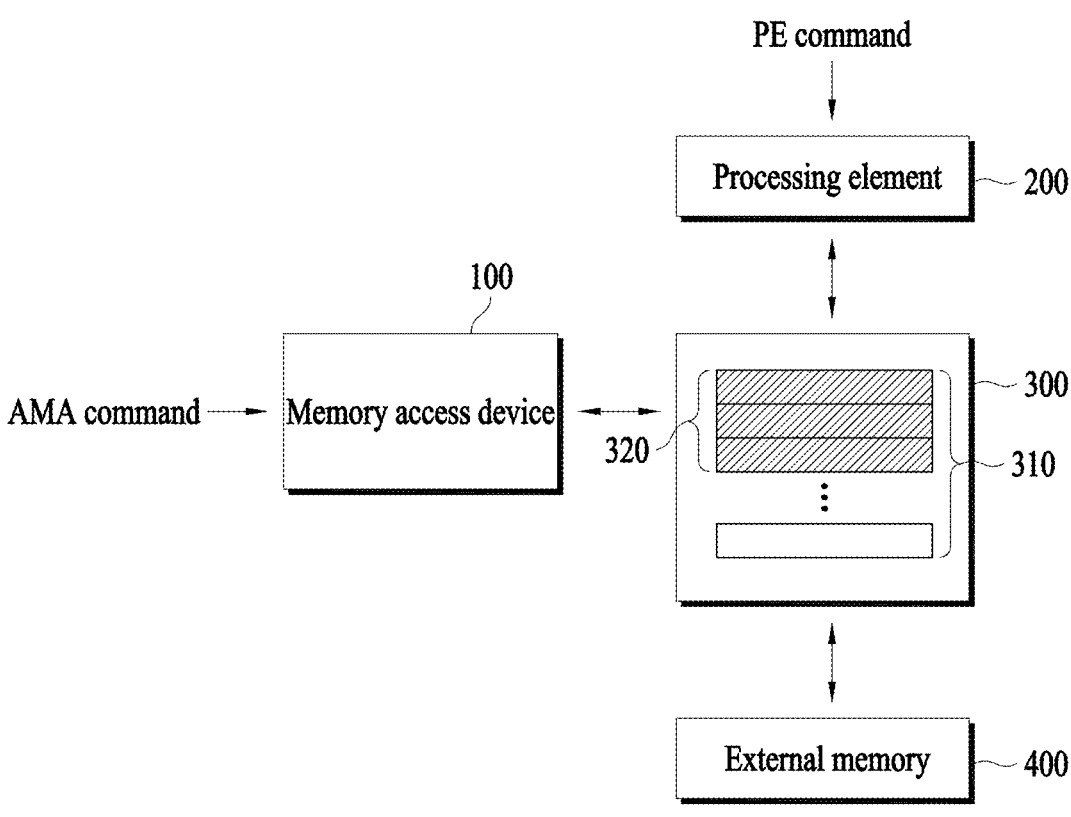
FIG. 6 illustrates an operation of a memory access device according to a fourth example embodiment.

FIG. 6 illustrates an operation of a memory access device according to a fourth example embodiment.

The memory access device 100 may operate based on an AMA command. The AMA command may be a command requesting monitoring of the processing element 200 accessing a data line of the memory 300 and loading of data required by the processing element 200 to perform an operation based on a PE command.

The memory access device 100 may store (1-1)-th data, which is a portion of first data of the external memory 400, in a predetermined number of data lines 320 among a plurality of data lines 310 of the memory 300 based on the AMA command. Specifically, although the plurality of data lines 310 of the memory 300 is required to fully load the first data of the external memory 400, the memory access device 100 may store the (1-1)-th data of the first data in the predetermined number of data lines 320 of the memory 300.

Subsequently, the memory access device 100 may allow an access of the processing element 200 to the predetermined number of data lines 320. As a result, the processing element 200 may access the predetermined number of data lines 320 to read the data and perform an operation based on the PE command.

The memory access device 100 may identify a number of accesses of the processing element 200 to the predetermined number of data lines 320.

When the number of accesses of the processing element 200 to each of the predetermined number of data lines 320 reaches a predetermined number of accesses, the memory access device 100 may store (1-2)-th data, which is another portion of the first data, in the predetermined number of data lines 320 among the plurality of data lines 310. Subsequently, the memory access device 100 may allow the access of the processing element 200 to the predetermined number of data lines 320. As a result, the processing element 200 may access the predetermined number of data lines 320 to read the data and perform the operation based on the PE command.

Likewise, when the number of accesses of the processing element 200 to each of the predetermined number of data lines 320 reaches the predetermined number of accesses, and when the first data includes other data in addition to the (1-1)-th data and the (1-2)-th data, the memory access device 100 may store, in the predetermined number of data lines 320, the other data or a portion of the other data based on a quantity of data acceptable in the predetermined number of data lines 320 and allow the access of the processing element 200 to the predetermined number of data lines 320. As a result, the first data may be fully loaded and processed by the processing element 200.

For example, in order to load the first data stored in ten data lines (e.g., a first data line to a tenth data line) of the external memory 400, the memory access device 100 may store the (1-1)-th data stored in three data lines (e.g., the first data line to a third data line), in the three data lines 320 of the memory 300. Subsequently, when a number of accesses of the processing element 200 to each of the three data lines 320 reaches four, the memory access device 100 may store the (1-2)-th data stored in three data lines (e.g., a fourth data line to a sixth data line) of the external memory 400 in the three data lines 320 of the memory 300. Subsequently, when the number of accesses of the processing element 200 to each of the three data lines 320 reaches four, the memory access device 100 may store (1-3)-th data stored in three data lines (e.g., a seventh data line to a ninth data line) of the external memory 400 in the three data lines 320 of the memory 300. Subsequently, when the number of accesses of the processing element 200 to each of the three data lines 320 reaches four, the memory access device 100 may store (1-4)-th data stored in one data line (e.g., the tenth data line) of the external memory 400 in one data line among the three data lines 320 of the memory 300.

According to an example embodiment, the memory access device 100 may store the data of the external memory 400 in the memory 300 using only the predetermined number of data lines 320 based on Equation 1 below.

$$Addr=addr\_base+addr\_offset \% num\_fold\_spm \qquad \text{[Equation 1]}$$

In Equation 1, Addr denotes address information of the memory 300 in which the data of the external memory 400 is to be stored, addr_base denotes based address information of the memory 300 in which the data is to be stored, addr_offset denotes offset address information of the memory 300 in which the data is stored, num_fold_spm denotes the predetermined number, and a % operator denotes an operator for calculating a remainder. For example, when storing five data of external memory 400 in memory 300, assuming that a base address is 0, offset addresses of the five data increase by 1, and the predetermined number is 3, addresses of the first data to third data may be 0, 1, and 2, and addresses of fourth data and fifth data may be 0 and 1.

As such, according to the present disclosure, when data loading is required for all the plurality of data lines, the data loading may be performed using only a portion of the plurality of data lines, which may reduce a consumption of an address space of the memory 300. In other words, according to the present disclosure, a smaller address space of the memory 300 may be consumed.

FIG. 6 illustrates the three data lines 320, and this is merely an example. The number of data lines may vary depending on examples.

Figure 7:
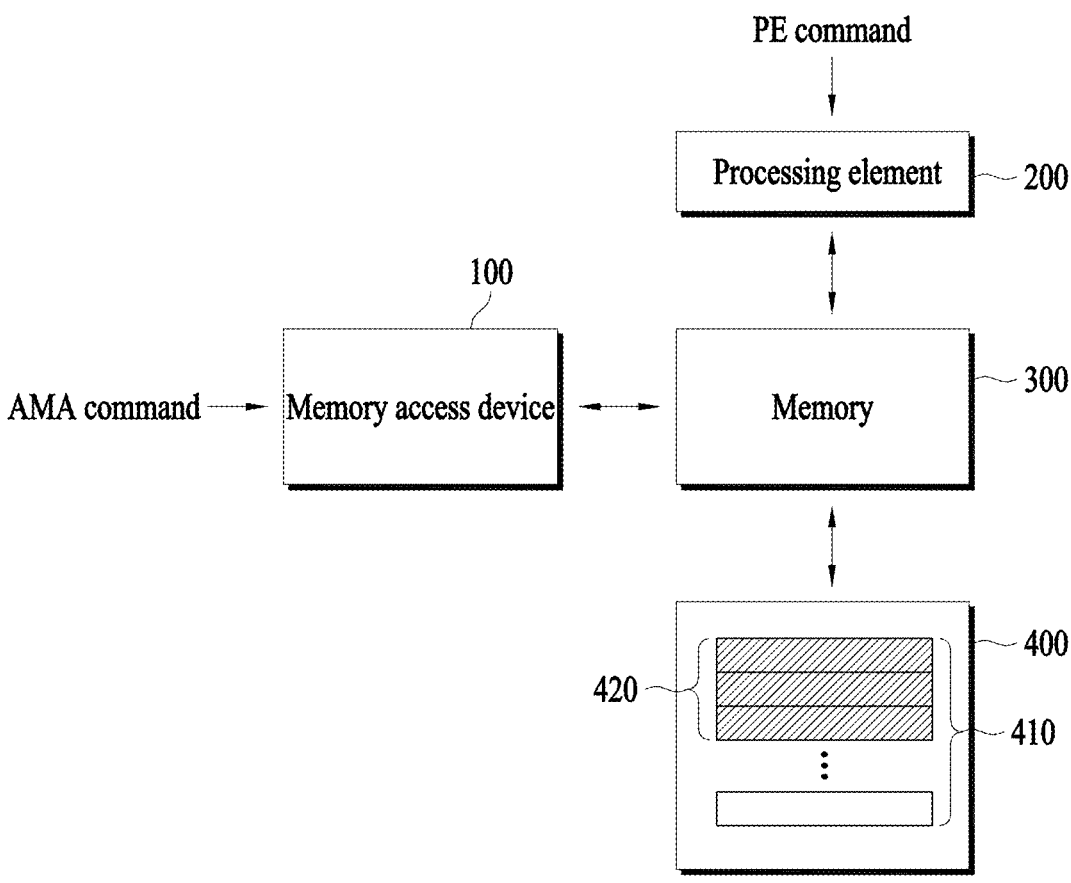
FIG. 7 illustrates an operation of a memory access device according to a fifth example embodiment.

FIG. 7 illustrates an operation of a memory access device according to a fifth example embodiment.

The memory access device 100 may operate based on an AMA command. The AMA command may be a command requesting monitoring of the processing element 200 accessing a plurality of data lines of the memory 300 based on a PE command and storing of operation result data of the processing element 200 stored in the plurality of data lines.

The memory access device 100 may store (1-1)-th data, which is a portion of first data stored in the plurality of data lines of the memory 300, in a predetermined number of data lines 420 among a plurality of data lines 410 of the external memory 400. Specifically, although the plurality of data lines 410 of the external memory 400 is required to fully load the first data of the memory 300, the memory access device 100 may store the (1-1)-th data of the first data in the predetermined number of data lines 420 of the external memory 400.

When a number of accesses of a predetermined processing element to each of the predetermined number of data lines 420 reaches a predetermined number of accesses, the memory access device 100 may store (1-2)-th data, which is another portion of the first data, in the predetermined number of data line 420 among a plurality of data lines 410. For example, the memory access device 100 may verify whether the predetermined number of accesses of the predetermined processing element to each of the predetermined number of data lines 420 reaches the predetermined number of accesses.

Likewise, when the number of accesses of the predetermined processing element to each of the predetermined number of data lines 420 reaches the predetermined number of accesses, and when the first data includes other data in addition to the (1-1)-th data and the (1-2)-th data, the memory access device 100 may store, in the predetermined number of data lines 420, the other data or a portion of the other data based on a quantity of data acceptable in the predetermined number of data lines 420.

For example, in order to store the first data stored in ten data lines (e.g., a first data line to a tenth data line) of the memory 300, the memory access device 100 may store the (1-1)-th data stored in three data lines (e.g., the first data line to a third data line) in the three data lines 420 of the external memory 400. Subsequently, when a number of accesses of the processing element to each of the three data lines 420 reaches two, the memory access device 100 may store the (1-2)-th data stored in three data lines (e.g., a fourth data line to a sixth data line) of the memory 300 in the three data lines 420 of the external memory 400. Subsequently, when the number of accesses of the processing element to each of the three data lines 420 reaches two, the memory access device 100 may store (1-3)-th data stored in three data lines (e.g., a seventh data line to a ninth data line) of the memory 300 in the three data lines 420 of the external memory 400. Subsequently, when the number of accesses of the processing element to each of the three data lines 420 reaches two, the memory access device 100 may store (1-4)-th data stored in one data line (e.g., the tenth data line) of the memory 300 in one data line among the three data lines 420 of the external memory 400.

According to an example embodiment, the memory access device 100 may store the data of the memory 300 in the external memory 400 using only the predetermined number of data lines 420 of the external memory 400 based on Equation 2 below.

$$Addr = addr\_base + addr\_offset \ \% \ num\_fold\_mem \qquad \text{[Equation 2]}$$

In Equation 2, Addr denotes address information of the external memory 400 in which the data of the memory 300 is to be stored, addr_base denotes based address information of the external memory 400 in which the data is to be stored, addr_offset denotes offset address information of the external memory 400 in which the data is stored, num_fold_mem denotes the predetermined number, and a % operator denotes an operator for calculating a remainder.

As such, according to the present disclosure, when data storing is required for all the plurality of data lines, the data storing may be performed using only a portion of the plurality of data lines, which may reduce a consumption of an address space of the external memory 400. In other words, according to the present disclosure, a smaller address space of the external memory 400 may be consumed.

Figure 8:
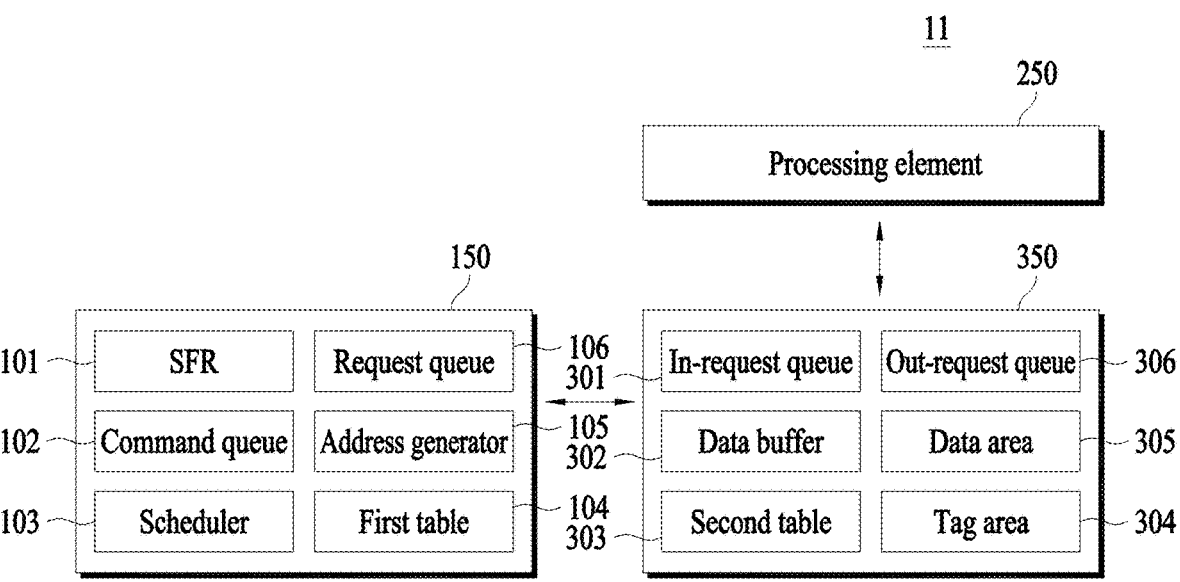
FIG. 8 illustrates an accelerator according to still another example embodiment.

FIG. 8 illustrates an accelerator according to still another example embodiment.

An accelerator 11 may include a memory access device 150, a processing element 250, and a memory 350. The memory access device 150 may include the memory access device 100 of FIGS. 1 through 7, the processing element 250 may include the processing element 200 of FIGS. 1 and 2, and the memory 350 may include the memory 300 of FIGS. 1 through 7. Thus, redundant descriptions will be omitted for brevity.

The memory access device 150 may include a special function register (SFR) 101, a command queue 102, a scheduler 103, a first table 104, an address generator 105, and a request queue 106. The memory 350 may include an in-request queue 301, a data buffer 302, a second table 303, a tag area 304, a data area 305, and an out-request queue 306. According to an example embodiment, the memory access device 150 may include a controller, and the controller may control an operation of each element of the memory access device 150. In addition, the memory 350 may include a controller, and the controller may control an operation of each element of the memory 350.

The SFR 101 may receive information on command settings, and change or set information on a command based on the information on the command settings. For example, the SFR 101 may change or set the information on the command during run time.

The command queue 102 may store at least one command input to the memory access device 150.

The scheduler 103 may sequentially process the at least one command stored in the command queue 102. The scheduler 103 may process the at least one command stored in the command queue 102 differently based on a type of command. According to an example embodiment, for an AMA command requesting monitoring of at least one data line, the scheduler 103 may configure the first table 104 for the AMA command. Also, for a DMA command requesting data loading or storing, the scheduler 103 may request the address generator 105 to generate an address for data loading or storing based on a DMA command.

According to an example embodiment, based on at least one command, at least one first table 104 corresponding to each of the at least one command may be set. The first table 104 may be configured based on a register and may contain information required for an operation of the memory access device 150. Table 2 represents an example of information included in the first table 104.

TABLE 2

| Field | Bit-length | Description |
|---|---|---|
| status | 2 | 0 = invalid, 1 = wait, 2 = run, 3 = line-released |
| art_id | 3 | ART(Async Region Table) IDs. 8 ea. |
| line_dep_art_id | 3 | Representing a next ART ID due to line dependency. For example, only when num_fold_spm is greater than "2", statuses of two ARTs pointing to each other are changed to 'wait' and 'run' so that two async regions operate in a lock step manner. |

TABLE 2-continued

| Field | Bit-length | Description |
| --- | --- | --- |
| folding_cnt | 10 | Current folding count |
| line_release_table | 1024 | A number of entries of an internal memory 1024 bits for 128KB of memory with 128B line size When Request_type is monitoring and storing (MAS), the line dependency is released to generate a storing request along with mem_addr. Also, when any line dependency is released, if "line depending ART" is present, an ART status of a first table representing the corresponding art_id is changed to 'run'. |

In Table 2, 'status' denotes information on a status of the first table 104, 'art_id' denotes ID information on the first table 104, 'line_dep_art_id' denotes ID information of the first table corresponding to a command to be subsequently executed when at least one data line among the plurality of data lines managed by the first table 104 is released (or, when the number of accesses of the processing element to at least one data line reaches a predetermined number of accesses), 'folding_cnt' denotes information on a number of times that a predetermined number of data lines are redundantly used, and 'line_release_table' denotes information indicating whether the number of accesses of a processing element to each data line reaches the predetermined number of accesses.

The address generator 105 may generate memory address information for data loading or data storing based on a command or the first table 104 corresponding to the command. For example, in terms of data loading for transferring data from an external memory to an internal memory (e.g., the memory 300), the address generator 105 may generate information on an external memory address and an internal memory address, and in terms of data storing for transferring data from the internal memory to the external memory, the address generator 105 may generate information on an external memory address and an internal memory address.

Information on the address generated by the address generator 105 may be stored in the request queue 106 and transferred to the out-request queue 306 of the memory 350. Accordingly, the memory 350 may perform data loading and data storing based on the information on the address transferred to the out-request queue 306.

The second table 303 may be set based on the first table 104 or the command. According to an example embodiment, the memory 350 may receive information on the first table 104 or the command from the memory access device 100 and configure the second table 303. The second table 303 may be configured based on a register and contain information required for an operation of the memory 350. In addition, the second table 303 may be provided in plural, and the second table 303 corresponding to each command may exist. Table 3 represents an example of information included in the second table 303.

TABLE 3

| Field | Bit-length | Description |
| --- | --- | --- |
| status | 2 | 0 = invalid, 1 = wait, 2 = run, 3 = line-released |
| request_type | 2 | Four types. 0 = monitoring for reading only, 1 = monitoring for writing only, 2 = loading and monitoring (for reading), 3 = monitoring and storing (for reading/writing) |
| reuse_cnt | 5 | Five bits for monitoring |
| num_fold_spm | 5 | 0 = using only one base address, 1 = normal, 2 ~= generating an address according to the following equation (Addr = addr_base + addr_offset % num_fold_spm) |
| make_invalid | 1 | When this flag is set, a data line is made invalid after reusing. |

In Table 3, 'status' denotes information on a status of the first table 104 or the second table 303, 'request_type' denotes information on content requested by a command, 'reuse_cnt' denotes information on a predetermined number of accesses to a data line, num_fold_spm' denotes information on a number of data lines to be redundantly used in the memory 350, and 'make_invalid' denotes information indicating that an access to a data line is unavailable when a number of accesses to the data line reaches the predetermined number of accesses.

The data area 305 may include a plurality of data lines. The tag area 304 may include a first tag area and a second tag area corresponding to each of the plurality of data lines. The first tag area may contain information indicating whether to allow an access of a processing element to each data line, and the second tag area may contain information indicating a number of accesses of the processing element to each data line. For example, the tag area 304 may include the first tag area 322 and the second tag area 324 of FIG. 2.

The data buffer 302 may temporarily store data to be processed in the memory 300. For example, the data buffer 302 may temporarily store data to be stored in the data area 305.

The in-request queue 301 may acquire a request for an access of the processing element 250 to at least one data line of the data area 305. The in-request queue 301 may respond to the request for the access of the processing element 250 based on the first tag area. Specifically, when the first tag area has a value of "0" (indicating "invalid"), the in-request queue 301 may disallow the access of the processing element 250 to the data line to prevent the processing element 250 from performing reading or writing. In addition, when the first tag area has a value of "1" (indicating "valid"), the in-request queue 301 may allow the processing element 250 to access a data line to perform loading or writing.

According to an example embodiment, the memory access device 150 may sequentially receive the first AMA command and the second AMA command of FIG. 4 and sequentially operate based on the first AMA command and the second AMA command. In addition, the first processing element included in the processing element 250 may operate based on the first PE command of FIG. 4, and the second processing element included in the processing element 250 may operate based on the second PE command of FIG. 4.

First, the first table 104 (hereinafter, referred to as "ART0") may be set based on the first AMA command, and 'status' of ART0 may be changed to "run." In addition, the second table 303 (hereinafter, referred to as "AMT0") may be set based on ART0. Also, 'line_release_table' of ART0 may be initialized. For example, each bit of 'line_release_table' may be set to 1. When the number of accesses of the processing element to the data line reaches the predetermined number of accesses, ART0 may receive address information of the corresponding data line from AMT0 and change a bit of the corresponding data line of 'line_release_table' to 0. When 'line_release_table' of ART0 is initialized, 'spm_addr_base' and 'spm_addr_offset' of the first AMA command may be used.

Subsequently, the memory access device 150 may generate a memory request packet based on the address information of the memory 350 included in the first AMA command, the address information of the external memory, and 'art_id' of ART0 and transfer the memory request packet to the out-request queue 306. In this instance, the address information of the memory 350 included in the memory request packet may be adjusted based on 'num_fold_spm' included in the first AMA command. For example, the address information of the memory 350 may be adjusted according to Equation 1.

After the memory request packet is transferred to the external memory by the out-request queue 306, a response (e.g., data packet) from the external memory may be transferred to the memory 350, and when the corresponding data line is invalid, 'reuse_cnt' may be identified based on 'art_id' of ART0 of the data packet. When the data packet is stored in the data line, a status of the data line may change from "invalid" to "valid". For example, the value of the first tag area may change. The first processing element may access the data line only when the data line is valid, and such process may be scheduled in the in-request queue 301.

When the data line is accessed the predetermined number of times by the first processing element, AMT0 may transfer address information of the corresponding data line to ART0. In this instance, AMT0 may change the status of the corresponding data line to "invalid" based on 'make_invalid'. In addition, when 'folding_cnt' of ART0 is not 0, the memory access device 150 may generate a memory request packet and transfer the memory request packet to the memory 350. When any one data line is released, 'status' of ART0 may be changed to "line-released", and when 'line_dep_art_id' of ART0 is present, 'status' of the first table 104 having 'art_id' may be changed to "run."

Subsequently, the first table 104 (hereinafter, referred to as "ART1") may be set based on the second AMA command.

When the address of the memory 350 of ART0 is redundant with the address of ART1, and when 'status' of ART0 is "run", 'status' of ART1 may be set to "wait", and 'line_dep_art_id' of ART0 may be set to be an ID of ART1. When 'status' of ART0 is changed to "line-released", 'status' of ART1 may be changed to "run."

When 'status' of ART1 is "run", the memory access device 150 may generate a memory request packet along with 'art_id' of ART1 and transfer the memory request packet to the memory 350. The memory 350 may receive a response (e.g., data packet) corresponding to the memory request packet, and when the status of the corresponding data line is invalid, 'reuse_cnt' may be identified based on 'art_id' of ART1 of the data packet. In addition, the status of the data line changes from "invalid" to "valid", which may allow the second processing element to access the data line. When the status of the data line is "valid", the status of the corresponding data line is to be invalid in response to a use of the corresponding data line in the first AMA command being completed, and accordingly, the data packet may be stored in the corresponding data line. When a response from AMT1 for all data lines in 'line_release_table' of ART1 is transferred to ART1, 'status' of ART1 may be changed to "invalid."

According to another example embodiment, the memory access device 150 may operate based on the AMA command of FIG. 5, and the processing element 250 may operate based on the PE command of FIG. 5.

First, the first table 104 (hereinafter, referred to as "ART0") may be set based on the AMA command, and 'status' of ART0 may be changed to "run." In addition, the second table 303 (hereinafter, referred to as "AMT0") may be set based on ART0. When 'reques_type' of the AMA command is not "loading and monitoring", at least a portion of the data area 305 may be changed to be valid so that the processing element 250 may access at least a portion. Also, 'line_release_table' of ART0 may be initialized. For example, each bit of 'line_release_table' may be set to 1. When the number of accesses of the processing element to the data line reaches the predetermined number of accesses, ART0 may receive address information of the corresponding data line from AMT0 and change a bit of the corresponding data line of 'line_release_table' to 0.

Subsequently, when a data line is accessed the predetermined number of times by the first processing element, AMT0 may transfer the address information of the corresponding data line to ART0. In this instance, AMT0 may change a status of the corresponding data line to be invalid according to 'make_invalid'. In addition, since 'request_type' of the AMA command is "monitoring and storing", ART0 may receive an address of the corresponding data line, change a bit corresponding to the address of 'line_release_table' of ART0 to 0, and transfer a memory writing request of the corresponding data line to the memory 350. In this instance, address information of the external memory may be adjusted based on 'num_fold_mem' of the AMA command. For example, the address information of the external memory may be adjusted based on Equation 2. When a response from AMT0 for all data lines in 'line_release_table' of ART0 is transferred to ART0, 'status' of ART0 can be changed to "invalid."

Figure 9:
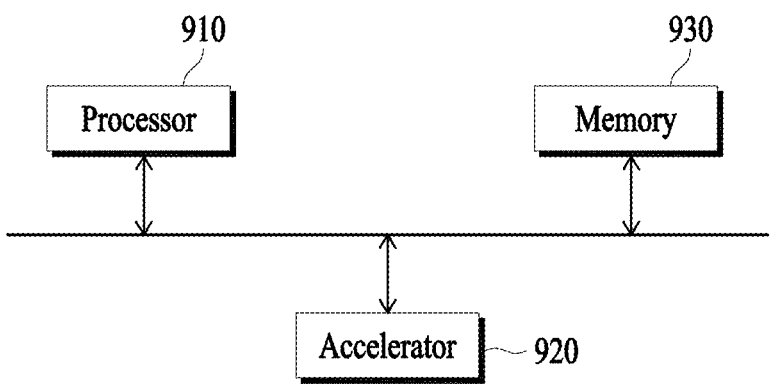
FIG. 9 illustrates an electronic device according to an example embodiment.

FIG. 9 illustrates an electronic device according to an example embodiment.

An electronic device may be implemented as various types of devices such as a personal computer (PC), a server device, a mobile device, an embedded device, and the like. According to an example embodiment, the electronic device may include, but is not limited to, a smartphone, a tablet device, an augmented reality (AR) device, an Internet of Things (IoT) device, a self-driving car, robotics, and a medical device that performs voice recognition, image recognition, and image classification using a neural network.

The electronic device may include a processor 910, an accelerator 920, and a memory 930. The processor 910, the accelerator 920, and the memory 930 may communicate with one another through a bus, a network on a chip (NoC), and a Peripheral Component Interconnect Express (PCIe). FIG. 9 illustrates only components of the electronic device related to the present example embodiment. However, it is obvious to those skilled in the art that other general-purpose components may be further included in addition to the components illustrated in FIG. 9

The processor 910 may serve to control overall functions to operate the electronic device. For example, the processor 910 may control the electronic device by executing one or more instructions or at least one program stored in the memory 930 within the electronic device. The processor 910 may be implemented as a central processing unit (CPU), a graphics processing unit (GPU), an application processor (AP), and the like in the electronic device, but is not limited thereto.

The memory 930 is hardware in which a variety of data processed in the electronic device is stored. For example, the memory 930 may store data processed or to be processed in the electronic device. In addition, the memory 930 may store applications, drivers, and the like to be driven by the electronic device. Also, the memory 930 may store commands to be executed on the accelerator 920, parameters of a neural network, input data to be inferred, and the like. The memory 930 may include random access memory (RAM), such as dynamic random access memory (DRAM), static random access memory (SRAM), read-only memory (ROM), electrically erasable programmable read-only memory (EEPROM), CD-ROM, Blu-ray or other optical disk storage, a hard disk drive (HDD), a solid state drive (SSD), or flash memory. According to an example embodiment, the memory 930 may be an off-chip memory.

The accelerator 920 may include the accelerator 10 of FIGS. 1 and 2 and the accelerator 11 of FIG. 8. According to an example embodiment, the accelerator 920 may include the accelerator 10 in plural.

According to an example embodiment, the processor 910 may receive a request to process a neural network-based inference task in the accelerator 920 and transmit a command to the accelerator 920 in response to the request. The accelerator 920 may execute a neural network based on the transmitted command to infer the input data.

Figure 10:
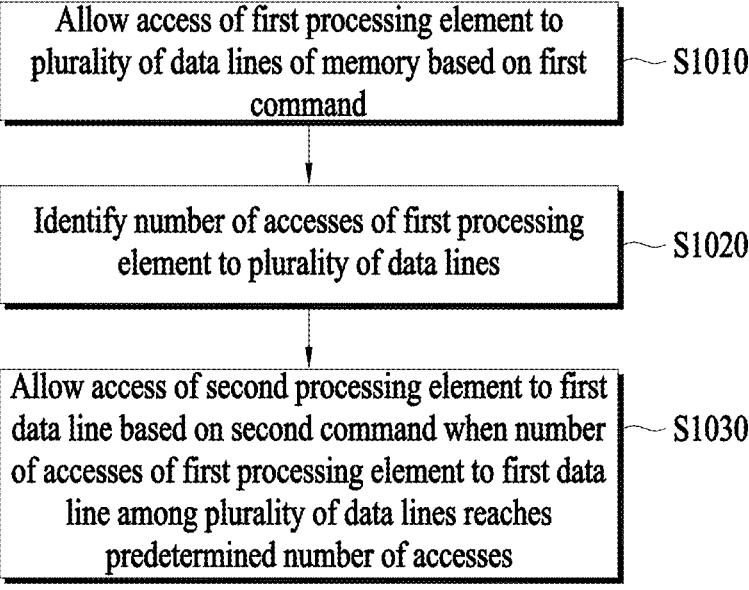
FIG. 10 illustrates an operating method of a memory access device according to an example embodiment.

FIG. 10 illustrates an operating method of a memory access device according to an example embodiment.

Each operation of the operating method of FIG. 10 may be performed by the memory access device 100 of FIGS. 1 and 2, and redundant descriptions made with reference to FIGS. 1 and 2 will be omitted.

In operation S1010, the memory access device 100 may allow an access of a first processing element to a plurality of data lines of a memory based on a first command. The memory may include the plurality of data lines, and a first tag area and a second tag area corresponding to each of the plurality of data lines. In the first tag area, information indicating whether to allow an access of a processing element for each data line may be stored. In the second tag area, information indicating a number of accesses of a processing element for each data line may be stored. The memory access device 100 may change information of the first tag area and allow the access of the first processing element to the plurality of data lines.

In operation S1020, the memory access device 100 may identify a number of accesses of the first processing element to the plurality of data lines. The memory access device 100 may monitor the second tag area to identify the number of accesses of the first processing elements to each of the plurality of data lines.

In operation S1030, when a number of accesses of the first processing element to a first data line among the plurality of data lines reaches a predetermined number of accesses, the memory access device 100 may allow an access of a second processing element to the first data line based on a second command.

When a number of accesses of the first processing element to a second data line among the plurality of data lines reaches the predetermined number of accesses, the memory access device 100 may allow an access of the second processing element to the second data line based on the second command.

The memory access device 100 may store (1-1)-th data of first data of an external memory in a predetermined number of data lines among the plurality of data lines of the memory. The memory access device 100 may allow an access of a processing element to the predetermined number of data lines. The memory access device 100 may identify a number of accesses of the processing element to the predetermined number of data lines. When a number of accesses of the processing element to each of the predetermined number of data lines reaches a predetermined number of accesses, the memory access device 100 may store (1-2)-th data of the first data in the predetermined number of data lines and allow the access of the processing element to the predetermined number of data lines.

The memory access device 100 may store the (1-1)-th data of the first data stored in the plurality of data lines of the memory, in the predetermined number of data lines among the plurality of data lines of the external memory. When the number of accesses of the processing element to each of the predetermined number of data lines reaches the predetermined number of accesses, the memory access device 100 may store the (1-2)-th data of the first data in the predetermined number of data lines.

The memory access device 100 may store the first data of the external memory in the plurality of data lines based on the first command. The memory access device 100 may allow an access of the first processing element to the plurality of data lines in which the first data is stored. When the number of accesses of the first processing element to the first data line among the plurality of data lines reaches the predetermined number of accesses, the memory access device 100 may store a portion of data among the second data of the external memory in the first data line based on the second command. The memory access device 100 may allow an access of the second processing element to the first data line in which the portion of data is stored. When a number of accesses of the first processing element to a second data line among the plurality of data lines reaches the predetermined number of accesses, the memory access device 100 may store another portion of data among the second data of the external memory in the second data line based on the second command. The memory access device 100 may allow an access of the second processing element to the second data line in which the other portion of data is stored.

The memory access device 100 may allow an access of the processing element to the plurality of data lines of the memory based on a third command. The memory access device 100 may identify a number of accesses of the processing element to the plurality of data lines. When a number of accesses of the processing element to the first data line among the plurality of data lines reaches the predetermined number of accesses, the memory access device 100 may store the data which is stored in the first data line, in the external memory. When a number of accesses of the processing element to the second data line among the plurality of data lines reaches the predetermined number of accesses, the memory access device 100 may store the data which is stored in the second data line, in the external memory.

The device in accordance with the above-described example embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present example embodiments may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present example embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present example embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described example embodiments are merely examples and other embodiments may be implemented within the scope of the following claims.

NATIONAL RESEARCH AND DEVELOPMENT
PROJECT SUPPORTING THIS INVENTION

[Project unique number] 1711193602
[Project number] 2020-0-01305-004
[Ministry Name] Ministry of Science and ICT
[Project management (specialized) institute name] Information and Communication Planning and Evaluation Institute
[Research project name] Next-generation intelligent semiconductor technology development (design)
[Research project name] Development of 2,000 TFLOPS server artificial intelligence deep learning processor and module
[Contribution rate] 1/1
[Name of the entity performing the project] Sapeon Korea Co., Ltd.
[Research Period] 2023 Jan. 1-2023 Dec. 31

The invention claimed is:

1. An operating method of a memory access device, the operating method comprising:

allowing an access of a first processing element to a plurality of data lines of a memory based on a first command;

identifying a number of accesses of the first processing element to the plurality of data lines; and when a number of accesses of the first processing element to a first data line among the plurality of data lines reaches a predetermined number of accesses, allowing an access of a second processing element to the first data line based on a second command, wherein the allowing of the access of the first processing element comprises:

storing first data of an external memory in the plurality of data lines based on the first command; and allowing an access of the first processing element to the plurality of data lines in which the first data is stored, and wherein the allowing of the access of the second processing element comprises:

when the number of accesses of the first processing element to the first data line among the plurality of data lines reaches the predetermined number of accesses, storing a portion of data among second data of the external memory in the first data line based on the second command; and allowing an access of the second processing element to the first data line in which the portion of data is stored.

2. The operating method of claim 1, further comprising when a number of accesses of the first processing element to a second data line among the plurality of data lines reaches the predetermined number of accesses, allowing an access of the second processing element to the second data line based on the second command.

3. The operating method of claim 1, wherein the memory comprises:

the plurality of data lines; and a first tag area and a second tag area storing information corresponding to each of the plurality of data lines, wherein the first tag area stores information indicating whether to allow an access of a processing element for each data line, wherein the second tag area stores information indicating a number of accesses of a processing element for each data line, wherein the allowing of the access of the first processing element comprises:

allowing the access of the first processing element to the plurality of data lines by changing information of the first tag area, and wherein the identifying comprises:

identifying the number of accesses of the first processing elements to each of the plurality of data lines by monitoring the second tag area.

4. The operating method of claim 1, further comprising:

storing a first data portion of first data of an external memory in a predetermined number of data lines among the plurality of data lines of the memory;

allowing an access of a processing element to the predetermined number of data lines;

identifying a number of accesses of the processing element to the predetermined number of data lines; and when a number of accesses of the processing element to each of the predetermined number of data lines reaches the predetermined number of accesses, storing a second data portion of the first data of the external memory in the predetermined number of data lines, and allowing the access of the processing element to the predetermined number of data lines.

5. The operating method of claim 1, further comprising:

storing a first data portion of first data stored in the plurality of data lines of the memory, in a predetermined number of data lines among a plurality of data lines of an external memory; and when a number of accesses of a processing element to each of the predetermined number of data lines reaches a second predetermined number of accesses, storing a second data portion of the first data in the predetermined number of data lines.

6. The operating method of claim 1, wherein the allowing of the access of the second processing element further comprises:

when a number of accesses of the first processing element to a second data line among the plurality of data lines reaches a second predetermined number of accesses, storing another portion of data among the second data of the external memory in the second data line based on the second command; and allowing an access of the second processing element to the second data line in which the another portion of data is stored.

7. The operating method of claim 1, wherein the allowing of the access of the first processing element further comprises:

storing a first data portion of the first data of the external memory in a predetermined number of data lines among the plurality of data lines of the memory;

allowing an access of the first processing element to the predetermined number of data lines;

identifying a number of accesses of the first processing element to the predetermined number of data lines; and when the number of accesses of the first processing element to each of the predetermined number of data lines reaches the predetermined number of accesses, storing a second data portion of the first data in the predetermined number of data lines and allowing the access of the first processing element to the predetermined number of data lines.

8. The operating method of claim 1, further comprising:

allowing an access of a processing element to the plurality of data lines of the memory based on a third command;

identifying a number of accesses of the processing element to the plurality of data lines; and when a number of accesses of the processing element to the first data line of the plurality of data lines reaches the predetermined number of accesses, storing data stored in the first data line in an external memory.

9. The operating method of claim 8, further comprising when a number of accesses of the processing element to a second data line among the plurality of data lines reaches the predetermined number of accesses, storing data stored in the second data line in the external memory.

10. The operating method of claim 1, wherein the memory comprises a scratchpad memory.

11. A non-transitory computer-readable recording medium comprising a program for performing the operating method of claim 1 on a computer.

12. A memory access device comprising:

a buffer in which a first command and a second command are stored; and a controller that allows an access of a first processing element to a plurality of data lines of a memory based on the first command by storing first data of an external memory in the plurality of data lines based on the first command and allowing an access of the first processing element to the plurality of data lines in which the first data is stored, identifies a number of accesses of the first processing element to the plurality of data lines, and when a number of accesses of the first processing element to a first data line among the plurality of data lines reaches a predetermined number of accesses, allows an access of a second processing element to the first data line based on the second command by storing a portion of data among second data of the external memory in the first data line based on the second command and allowing an access of the second processing element to the first data line in which the portion of data is stored.

13. An accelerator comprising:

a memory;

a first processing element;

a second processing element; and a memory access device that allows an access of the first processing element to a plurality of data lines of the memory based on a first command by storing first data of an external memory in the plurality of data lines based on the first command and allowing an access of the first processing element to the plurality of data lines in which the first data is stored, identifies a number of accesses of the first processing element to the plurality of data lines, and when a number of accesses of the first processing element to a first data line among the plurality of data lines reaches a predetermined number of accesses, allows an access of the second processing element to the first data line based on a second command by storing a portion of data among second data of the external memory in the first data line based on the second command and allowing an access of the second processing element to the first data line in which the portion of data is stored.

* * * * *